(12) United States Patent
Kang et al.

(10) Patent No.: US 8,088,356 B2
(45) Date of Patent: Jan. 3, 2012

(54) METAL CATION-DOPED COVALENT ORGANIC FRAMEWORK DERIVATIVES FOR HYDROGEN STORAGE AND METHOD OF USING THE SAME

(75) Inventors: Jeung Ku Kang, Daejeon (KR); Yoon Jeong Choi, Daejeon (KR); Jung Woo Lee, Daejeon (KR); Jung Hoon Choi, Daejeon (KR)

(73) Assignee: Korea Advanced Institute of Science and Technology, Yuseong-ku, Daejeon (KR)

( * ) Notice: Subject to any disclaimer, the term of this patent is extended or adjusted under 35 U.S.C. 154(b) by 1061 days.

(21) Appl. No.: 11/987,953

(22) Filed: Dec. 6, 2007

(65) Prior Publication Data

US 2011/0236301 A1    Sep. 29, 2011

(30) Foreign Application Priority Data

Nov. 21, 2007    (KR) .......................... 10-2007-0118906

(51) Int. Cl.
*B01J 20/00*    (2006.01)
*C07F 5/02*    (2006.01)

(52) U.S. Cl. .......................... 423/648.1; 502/526; 568/3
(58) Field of Classification Search .................... 96/108; 95/90, 116; 423/648.1; 502/526; 206/0.7; 568/3
See application file for complete search history.

(56) References Cited

U.S. PATENT DOCUMENTS

| | | | | |
|---|---|---|---|---|
| 7,582,798 | B2 * | 9/2009 | Yaghi et al. | ........................ 568/3 |
| 7,951,749 | B2 * | 5/2011 | Yang et al. | ..................... 502/415 |
| 2010/0143693 | A1 * | 6/2010 | Yaghi et al. | ................ 428/305.5 |
| 2011/0160511 | A1 * | 6/2011 | Hupp et al. | ................... 585/823 |

* cited by examiner

*Primary Examiner* — Frank Lawrence, Jr.
(74) *Attorney, Agent, or Firm* — The Nath Law Group; Joshua B. Goldberg; Tanya E. Harkins

(57) ABSTRACT

Disclosed are a novel hydrogen storage material with enhanced hydrogen storage capacity prepared by doping an organic framework material with light metal cations, and a method of using the same for hydrogen storage. The present inventive material has at least one phenyl group at each face of a triangular building unit, which is doped with metal cations such as alkali metal cations, alkali-earth metal cations, etc., so that the material exhibits greatly improved capacity of hydrogen absorption and desorption at room temperature and can provide hydrogen storage materials practically adapted for fuel batteries useable even at room temperature.

19 Claims, 5 Drawing Sheets

METAL CATION-DOPED COVALENT ORGANIC FRAMEWORK DERIVATIVES FOR HYDROGEN STORAGE AND METHOD OF USING THE SAME

This application claims priority to Korean Patent Application No. 10-2007-0118906, filed on Nov. 21, 2007, in the Korean Intellectual Property Office, the entire contents of which are hereby incorporated by reference.

BACKGROUND OF THE INVENTION

1. Field of the Invention

The present invention relates to metal cation-doped covalent organic framework derivatives for hydrogen storage and uses thereof, more particularly, to a novel hydrogen storage material with enhanced hydrogen storage capacity prepared by doping an organic framework material with light metal cations and a method of using the same for hydrogen storage.

2. Description of the Related Art

Fossil fuels have cornered more than 90% of traditionally used energy needs and it is known that they are unable to be re-generated, limited in their reserves and importantly cause environmental problems due to pollutants such as carbon dioxide gas generated by combustion.

As a clean energy resource, hydrogen energy has recently received attention as an alternative to such fossil fuels. For fuel battery systems using hydrogen, there are advantages in that they can infinitely generate hydrogen from water thereby eliminating concern for exhaustion of natural resources and they never discharge environmental pollutants such as $CO_2$ as hydrogen is used.

However, the above fuel battery systems need a hydrogen storage medium in order to use hydrogen, and the DOE (Department of Energy) in the U.S.A. has proposed applicable standard values for hydrogen storage materials. Extensive research and investigation into development of a hydrogen storage medium which fulfills the standard values proposed by the DOE is recently proceeding on the basis of carbon nanotubes, inorganic framework materials, metal hydride compounds, etc.

In 2007, Yaghi research group reported three-dimensional covalent structural organic frameworks (3D COFs), which comprise covalent bonds of unit organic molecules to form triangular and tetrahedral structures. See Science, 316, 268 (2007).

It was introduced that four kinds of COFs disclosed in the above reported document have pores with size of 1 to 2 nanometers and thermal stability even at more than 350° C. COFs with suitable pore structure and surface area have the potential to be used as storage materials, filters or the like.

However, there are undesirable problems in conventional technologies for hydrogen storage materials, which have not satisfied the applicable standard values for hydrogen storage materials proposed by the DOE, since, for example, carbon nanotubes or inorganic frameworks are combined together by physical adsorption with very low binding energy between the storage materials and hydrogen molecules such that they show very low hydrogen storage capacity at room temperature under ambient pressure, or, metal hydrogen compounds are combined together by chemical adsorption with very high binding energy so that they require alternative energy for discharging hydrogen.

SUMMARY OF THE INVENTION

Accordingly, the present invention is directed to solve problems of conventional methods as described above and, an object of the present invention is to provide a novel hydrogen storage material prepared by doping an organic framework material with light metal cations, which exhibits potentially massive absorption and desorption of hydrogen at room temperature.

Another object of the present invention is to provide a method for hydrogen storage using the hydrogen storage material prepared as described above.

In order to achieve the objects described above, the present invention provides a covalent organic framework derivative for hydrogen storage, which has a specific crystalline structure comprising covalent bonds of regular tetrahedron structural organic molecules and triangle structural organic molecules doped with metal cations.

The present invention also provides a method for hydrogen storage by adsorbing hydrogen molecules to metal cations such as alkali metal or alkali-earth metals doped to the covalent organic framework derivative described above.

In an aspect of the present invention, there is provided a covalent organic framework derivative for hydrogen storage, which has a specific crystalline structure comprising covalent bonds of regular tetrahedron structural organic molecules and triangle structural organic molecules doped with metal cations.

The term "covalent organic framework" used in the present invention means a material having three-dimensional structure comprising covalent bonds of unit organic molecules in the form of triangular or tetrahedral structure and, more particularly, an organic constructional material that has microporous crystal structure with less than 2 nanometers or mesoporous crystal structure with more than 2 nanometers and comprises molecular building blocks covalently bonded together, which are fabricated of light atoms such as hydrogen, boron, carbon, nitrogen, oxygen and so on.

The covalent organic framework derivative according to the present invention is characterized in that a central atom in the regular tetrahedral structure is one of elements belonging to Group 14 in the Periodic Table, preferably, carbon (C) or silicon (Si).

Such derivative of the present invention is further characterized in that four bonds of the central atom in the tetrahedral structure are linked with a face of the triangular structure by covalent bonding, respectively.

The present inventive derivative has $B_3O_3$ or $C_2O_2B$ ring as the center of the triangular structure.

The ring of the derivative has bonds with boron (B) to form triangular faces and, in view of a boron oxide ring as the ring, the derivative is any specific organic molecule having at least one and, preferably, one or two phenyl group(s) on each of the triangular faces.

The covalent organic framework derivative of the present invention is prepared from diboronic acid containing phenyl group such as 1,4-benzene diboronic acid, so that the derivative contains at least one and, preferably, one or two phenyl group(s) in an organic molecule bonded to boron (B) of the $B_3O_3$ ring.

For the covalent organic framework derivative of the present invention, metal cations described above comprise alkali metal cations or alkali-earth metal cations. Since light metal cations have reduced weight sufficient to increase hydrogen storage efficiency and form no metal cluster rings, which are usually represented during metal doping, the metal cations are not particularly limited but are preferably light with small atomic weight such as monovalent lithium cation $Li^+$, bivalent magnesium cation $Mg^{2+}$ and the like.

The triangular organic molecules to fabricate the covalent organic framework derivative according to the present invention are possibly doped with metal cations by well known techniques including, for example, solution-phase method and vapor-phase method.

The framework structure of the covalent organic framework derivative according to the present invention comprises three-dimensional network structures of organic molecules which are formed of carbon, oxygen, boron, hydrogen and/or silicon. The monovalent lithium cation doped to the covalent organic framework can adsorb up to three hydrogen molecules, while the bivalent magnesium cation doped to the covalent organic framework can adsorb a maximum of six hydrogen molecules.

In addition to two hydrogen molecules adsorbed to one oxygen of the organic molecules to fabricate triangular unit structure of a pure organic framework, the above described metal cations enhance hydrogen storage capacity and have binding energy in a defined range capable of adsorbing hydrogen molecules even at near room temperature.

In another aspect of the present invention, there is provided a method for hydrogen storage using the covalent organic framework derivative described above, which comprises adsorption of hydrogen molecules to metal cations doped to the covalent organic framework derivative such as monovalent lithium cations $Li^+$, bivalent magnesium cations $Mg^{2+}$, etc.

According to the present invention, the covalent organic framework noticeably increases hydrogen absorption and desorption capacity at room temperature by doping metal cations, for example, light alkali metal cations or alkali-earth metal cations to the covalent organic framework which has at least one phenyl group in each face of triangular building unit, compared to existing hydrogen storage materials, thereby providing a hydrogen storage material more practically adapted for a fuel battery usable even at near room temperature.

BRIEF DESCRIPTION OF THE DRAWINGS

These and other objects, features, aspects, and advantages of the present invention will be more fully described in the following detailed description of preferred embodiments and examples, taken in conjunction with the accompanying drawings. In the drawings:

FIGS. 1A to 5C illustrate carbon (C) as grey spheres, hydrogen (H) as white spheres, oxygen (O) as red spheres, boron (B) as pink spheres, lithium cations ($Li^+$) as violet spheres, magnesium cations ($Mg^{2+}$) as yellow spheres and silicon (Si) as orange spheres; in particular, FIG. 1A shows 2×1×1 unit cell form of COF 102 as one of three-dimensional covalent organic frameworks;

FIG. 4 shows monovalent lithium cations (violet) bound to phenyl groups of $C_2O_2B$ rings representing triangular structures of COF 105 and COF 108 as three-dimensional covalent organic frameworks;

FIG. 5C shows a maximum of six hydrogen molecules combined with bivalent magnesium cations bound to $C_2O_2B$.

DETAILED DESCRIPTION OF THE INVENTION

Hereinafter, the present invention will become apparent from the following examples and experimental examples with reference to the accompanying drawings.

Figure 1A:
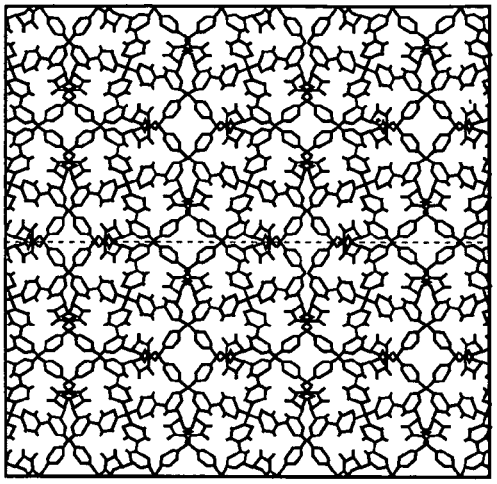
Figure 1B:
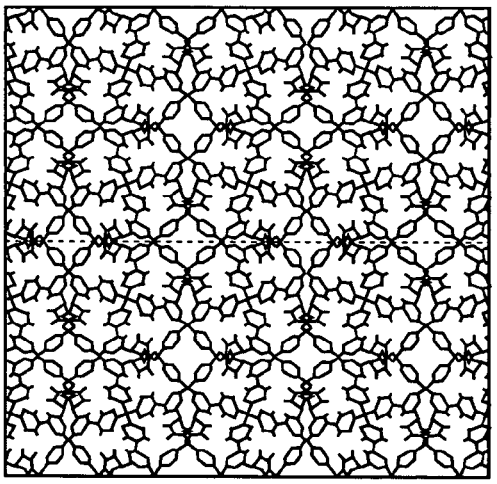
FIG. 1B shows 2×1×1 unit cell form of COF 103 as one of three-dimensional covalent organic frameworks.
Figure 1C:
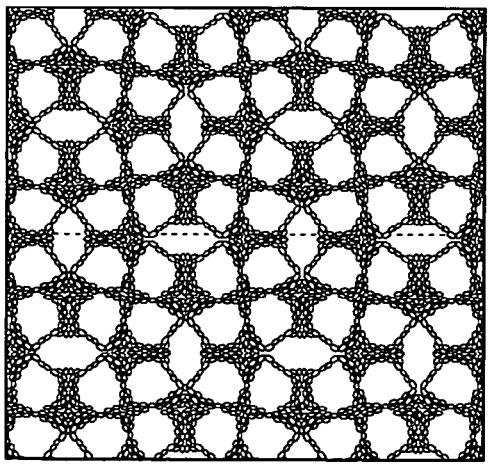
FIG. 1C shows 2×1×1 unit cell form of COF 105 as one of three-dimensional covalent organic frameworks.
Figure 1D:
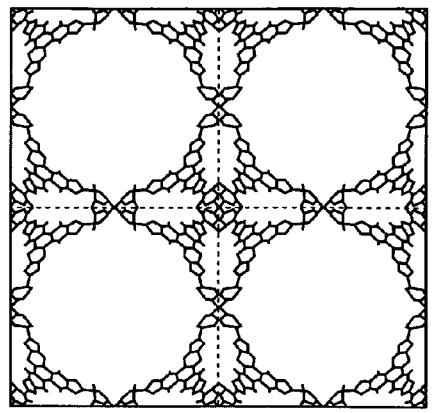
FIG. 1D shows 2×1×1 unit cell form of COF 108 as one of three-dimensional covalent organic frameworks.
Figure 2A:
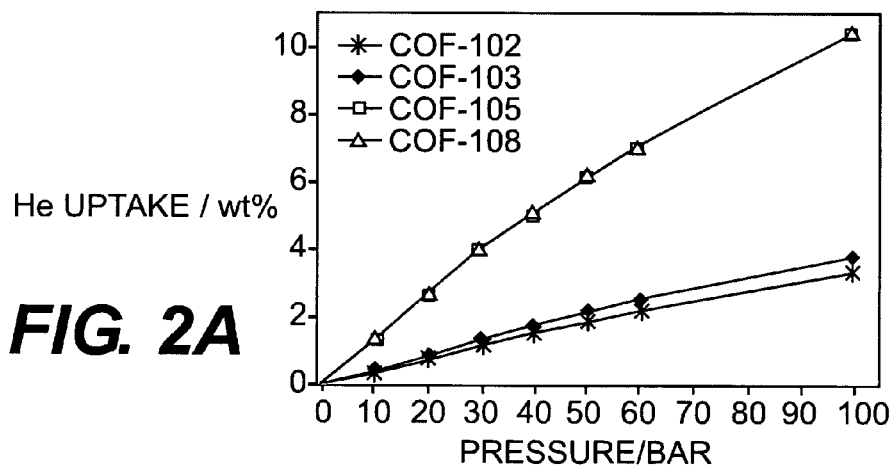
FIG. 2A illustrates calculated results of absolute adsorption amount (% by weight) at the temperature of 77K under altered pressure conditions for COF 102, COF 103, COF 105 and COF 108 as pure organic frameworks.
Figure 2B:
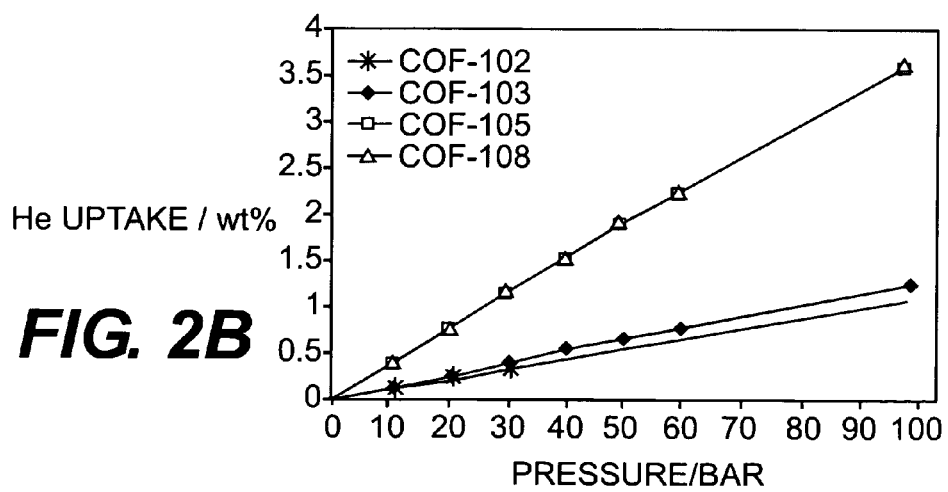
FIG. 2B illustrates calculated results of absolute adsorption amount (% by weight) at the temperature of 298K under altered pressure conditions for COF 102, COF 103, COF 105 and COF 108 as pure organic frameworks.

FIGS. 2A and 2B illustrate measured results of absolute adsorption amounts (% by weight) at 77K (FIG. 2A) and 298K (FIG. 2B) under altered pressure conditions for pure covalent organic frameworks, for example, COF 102, COF 103, COF 105 and COF 108 as described in FIGS. 1A to 1D.

Referring to FIGS. 2A and 2B, COF 105 and COF 108 among the covalent organic frameworks show a hydrogen storage rate of about 10% by weight at low temperature under 100 bar and about 3.5% by weight (hereinafter, often abbrev. to "wt. %") as a relatively higher value even at 298K as the room temperature.

Figure 3A:
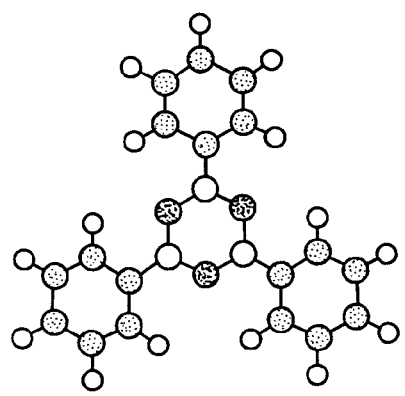
FIG. 3A shows $B_3O_3$ ring structures representing triangular structures of COF 102 and COF 103 as three-dimensional covalent organic frameworks.
Figure 3B:
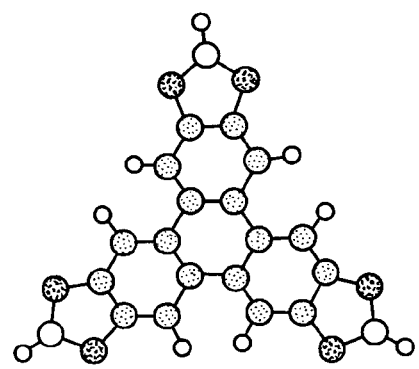
FIG. 3B shows $C_2O_2B$ ring structures representing triangular structures of COF 105 and COF 108 as three-dimensional covalent organic frameworks.

FIG. 3A shows $B_3O_3$ ring structures representing triangular structures of COF 102 and COF 103 as three-dimensional covalent organic frameworks, while FIG. 3B shows $C_2O_2B$ ring structures representing triangular structures of COF 105 and COF 108 as three-dimensional covalent organic frameworks. Referring to FIGS. 3A and 3B, the organic molecules to fabricate the triangular structures of the covalent organic frameworks were $B_3O_3$ rings and $C_2O_2B$ rings, respectively.

Since phenyl group was recently reported as the only suitable organic molecule for fabricating $B_3O_3$ ring, $B_3O_3$ ring exhibited reduced space efficiency due to tetrahedral structure linked to the ring. Accordingly, it was shown in FIG. 2 that the covalent organic framework with $B_3O_3$ ring has hydrogen storage capacity lower than that of the covalent organic framework based on $C_2O_2B$ ring. As a result, in case when the $B_3O_3$ ring structure is an unsaturated organic molecule having two or more phenyl groups, the hydrogen storage capacity of the covalent organic framework is also enhanced.

Figure 4:
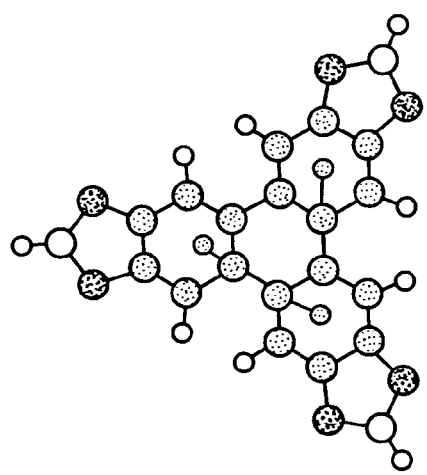

FIG. 4 shows monovalent lithium cations (violet) bound to phenyl groups of $C_2O_2B$ rings representing triangular structures of three-dimensional covalent organic frameworks such as COF 105 and COF 108. Referring to FIG. 4, one side phenyl group of the ring can be bound to one of alkali metal cations while three side phenyl groups can be bound to three monovalent lithium cations or three bivalent magnesium cations.

Figure 5A:
FIG. 5A shows hydrogen molecules adsorbed to pure $C_2O_2B$ rings.
Figure 5B:
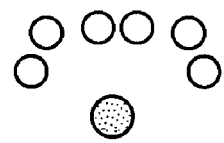
FIG. 5B shows a maximum of three hydrogen molecules combined with monovalent lithium cations bound to $C_2O_2B$.
Figure 5B:
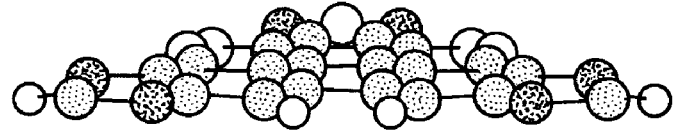
Figure 5C:
Figure 5C:
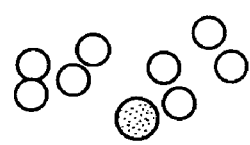
Figure 5C:
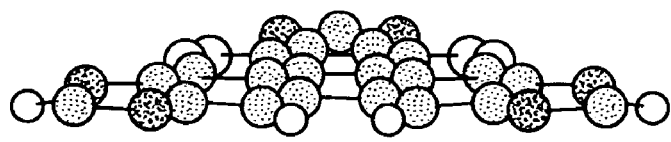
Figure 6:
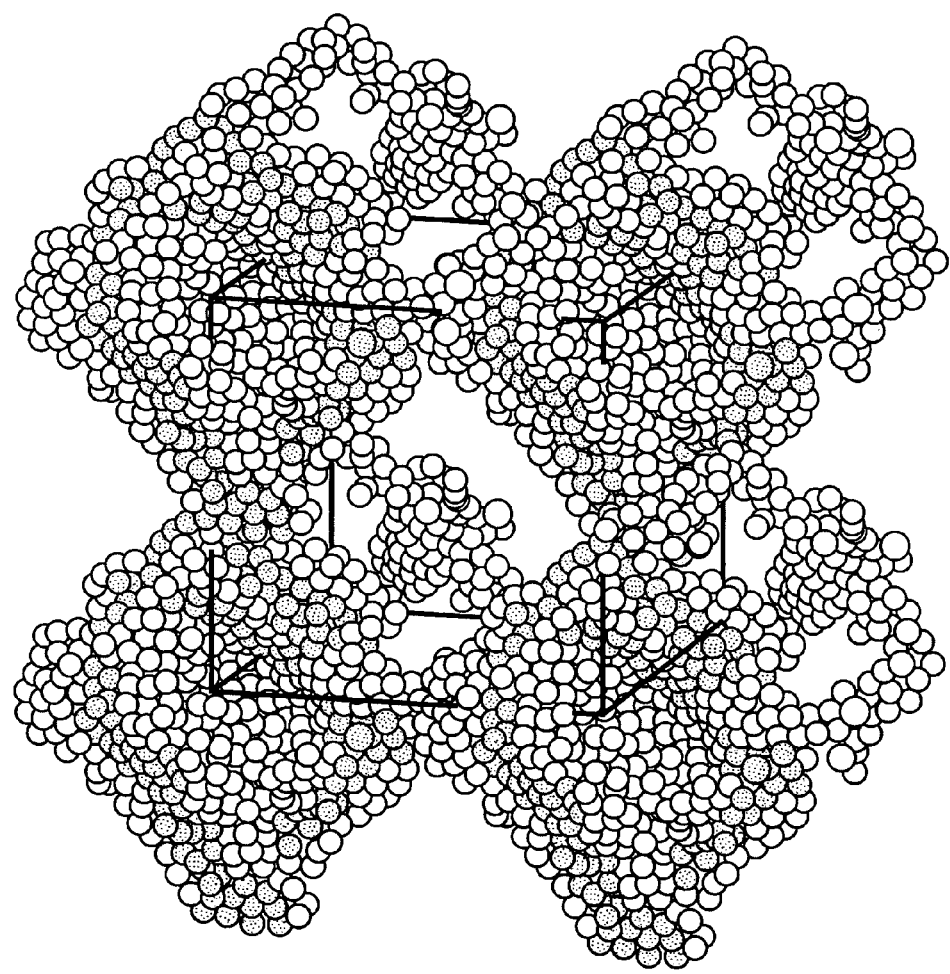
FIG. 6 illustrates adsorption of hydrogen molecules to unit cells of COF 108 doped with bivalent magnesium cations, in which brown spheres are carbon, green ones are magnesium, red ones are oxygen, pink ones are boron and yellow ones are hydrogen.

FIG. 5A shows hydrogen molecules adsorbed to pure $C_2O_2B$ rings and, the most stable adsorption site is near oxygen where two hydrogen molecules are adsorbed to both sides of one oxygen molecule with binding energy of average 5.6 kJ/mol. FIGS. 5B and 5C show maximum number of hydrogen molecules possibly bound to lithium cations and magnesium cations, respectively, in which binding energies were on average 27.0 kJ/mol and 28.6 kJ/mol, respectively.

Referring to FIGS. 5A to 5C, unit cell of COF 108 as the covalent organic framework can absorb hydrogen molecules of up to 6.5 wt. % for doping with lithium cations and up to 7.5 wt. % for doping with magnesium cations.

Considering that standard value of hydrogen storage was defined to 6 wt. % to total weight of materials required for use of automobiles until 2010 by the DOE, the covalent organic framework COF 108 of the present invention is advantageously available because the covalent organic framework doped with monovalent lithium cations can store 6.5 wt. % of hydrogen while the one doped with bivalent magnesium cations can store 7.5 wt. % of hydrogen.

Hereinafter, the present invention will be more particularly described by the preferred embodiments and examples. However, these are intended to illustrate the invention as preferred embodiments of the present invention and do not limit the scope of the present invention.

Example 1

Preparation of Covalent Organic Framework Derivative Doped with $Li^+$ Ions 1.0 mL of a solution of mesitylene and dioxane with 1:1 ratio by volume (v/v) and 0.10 mmol of tetra(4-(dihydroxy) borylphenyl)methane having one phenyl group were placed in a pyrex tube.

The pyrex tube was instantly frozen to 77K in a $LN_2$ bath, vacuum treated and sealed by decreasing internal pressure of the tube to 150 mTorr.

After heating the reaction mixture in the tube at 85° C. for 4 days, the resultant white precipitate was separated and washed using 10 mL of anhydrous tetrahydrofuran. The treated mixture was dipped in another 10 mL of anhydrous tetrahydrofuran for 8 hours.

Next, evaporating the solvent at room temperature under vacuum conditions resulted in a covalent organic framework in white powder form, which has carbon as a center atom in the tetrahedral structure and one phenyl group at a face of $B_3O_3$ ring.

The resultant framework was placed in a solution comprising lithium acetate dihydrate ($CH_3COOLi.2H_2O$) in a chloroform solution. After stirring the solution by a magnetic stirrer to homogeneously disperse the lithium acetate solution, the chloroform solution was completely evaporated to provide a covalent organic framework dispersed with lithium acetate.

After this, lithium acetate was converted into lithium metal by reducing treatment at 150° C. for 2 hours while flowing 200 sccm (Standard Cubic Centimeters per Minute) of hydrogen to produce a covalent organic framework derivative, which has carbon as a center atom in the tetrahedral structure and one phenyl group at a face of $B_3O_3$ ring doped with lithium ions.

Example 2

Preparation of Covalent Organic Framework Derivative Doped with $Li^+$ Ions 1.0 mL of a solution of mesitylene and dioxane with 1:1 ratio by volume (v/v) and 0.10 mmol of tetra(4-(dihydroxy) borylphenylphenyl)methane having two phenyl groups were placed in a pyrex tube.

The pyrex tube was instantly frozen to 77K in a $LN_2$ bath, vacuum treated and sealed by decreasing internal pressure of the tube to 150 mTorr.

After heating the reaction mixture in the tube at 85° C. for 4 days, the resultant white precipitate was separated and washed using 10 mL of anhydrous tetrahydrofuran. The treated mixture was dipped in another 10 mL of anhydrous tetrahydrofuran for 8 hours.

Next, evaporating the solvent at room temperature under vacuum conditions resulted in a covalent organic framework in white powder form, which has carbon as a center atom in the tetrahedral structure and one phenyl group at a face of $B_3O_3$ ring.

In order to remove solvent ingredient contained in pores of the covalent organic framework, the framework underwent heat treatment at 150° C. for 2 hours. The treated framework with empty pores was placed in a tube together with lithium precursor in the form of organic metal compound, followed by heating the lithium precursor to diffuse lithium precursor ingredients into the pores, and in turn, produce a covalent organic framework containing the lithium precursor ingredients homogeneously dispersed therein.

After this, lithium acetate was converted into lithium metal by reducing treatment at 150° C. for 2 hours while flowing 200 sccm of hydrogen to produce a covalent organic framework derivative, which has carbon as a center atom in the tetrahedral structure and two phenyl groups at a face of $B_3O_3$ ring doped with lithium ions.

Example 3

Preparation of Covalent Organic Framework Derivative Doped with $Li^+$ Ions

The procedure described in Example 1 was repeatedly conducted, except that tetra(4-(dihydroxy)borylphenylacetylphenyl)methane having one unsaturated acetyl group and two phenyl groups was used instead of (4-(dihydroxy) borylphenyl)methane to produce a covalent organic framework derivative, which has carbon as a center atom in the tetrahedral structure and one unsaturated acetyl group and two phenyl groups at a face of $B_3O_3$ ring doped with lithium ions.

Example 4

Preparation of Covalent Organic Framework Derivative Doped with $Mg^{2+}$ Ions

The procedure described in Example 1 was repeatedly conducted, except that bivalent Mg cations as metal cations were used instead of monovalent Li cations to produce a covalent organic framework derivative, which has carbon as a center atom in the tetrahedral structure and one phenyl group at a face of $B_3O_3$ ring doped with magnesium ions.

Example 5

Preparation of Covalent Organic Framework Derivative Doped with $Mg^{2+}$ Ions

The procedure described in Example 2 was repeatedly conducted, except that bivalent Mg cations as metal cations were used instead of monovalent Li cations to produce a covalent organic framework derivative, which has carbon as a center atom in the tetrahedral structure and two phenyl groups at a face of $B_3O_3$ ring doped with magnesium ions.

Example 6

Preparation of Covalent Organic Framework Derivative Doped with $Mg^{2+}$ Ions The procedure described in Example 2 was repeatedly conducted, except that bivalent Mg cations as metal cations were used instead of monovalent Li cations to produce a covalent organic framework derivative, which has carbon as a center atom in the tetrahedral structure and one unsaturated acetyl group and two phenyl groups at a face of $B_3O_3$ ring doped with magnesium ions.

Example 7

Preparation of Covalent Organic Framework Derivative Doped with $Li^+$ Ions The procedure described in Example 1 was repeatedly conducted, except that tetra(4-(dihydroxy)borylphenyl)silane and 1.5 mL of mesitylene:dioxane solution with 3:1 ratio by volume (v/v) were used instead of (4-(dihydroxy)borylphenyl)methane and 1.0 mL of mesitylene:dioxane solution with 1:1 ratio by volume (v/v), respectively, to produce a covalent organic framework derivative, which has silicon as a center atom in the tetrahedral structure and one phenyl group at a face of $B_3O_3$ ring doped with lithium ions.

Example 8

Preparation of Covalent Organic Framework Derivative Doped with $Li^+$ Ions The procedure described in Example 7 was repeatedly conducted, except that tetra(4-(dihydroxy)borylphenylphenyl)silane having two phenyl groups were used instead of tetra(4-(dihydroxy)borylphenyl)silane to produce a covalent organic framework derivative, which has silicon as a center atom in the tetrahedral structure and two phenyl groups at a face of $B_3O_3$ ring doped with magnesium ions.

Example 9

Preparation of Covalent Organic Framework Derivative Doped with $Li^+$ Ions The procedure described in Example 7 was repeatedly conducted, except that tetra(4-(dihydroxy)borylphenylacetylphenyl)silane having two phenyl groups and one acetyl group were used instead of tetra(4-(dihydroxy)borylphenyl)silane to produce a covalent organic framework derivative, which has silicon as a center atom in the tetrahedral structure and two phenyl groups and one unsaturated acetyl group at a face of $B_3O_3$ ring doped with magnesium ions.

Example 10

Preparation of Covalent Organic Framework Derivative Doped with $Mg^{2+}$ Ions The procedure described in Example 7 was repeatedly conducted, except that bivalent Mg cations as metal cations were used instead of monovalent Li cations to produce a covalent organic framework derivative, which has silicon as a center atom in the tetrahedral structure and one phenyl group at a face of the derivative doped with magnesium ions.

Example 11

Preparation of Covalent Organic Framework Derivative Doped with $Mg^{2+}$ Ions The procedure described in Example 8 was repeatedly conducted, except that bivalent Mg cations as metal cations were used instead of monovalent Li cations to produce a covalent organic framework derivative, which has silicon as a center atom in the tetrahedral structure and two phenyl groups at a face of the derivative doped with magnesium ions.

Example 12

Preparation of Covalent Organic Framework Derivative Doped with $Mg^{2+}$ Ions The procedure described in Example 9 was repeatedly conducted, except that bivalent Mg cations as metal cations were used instead of monovalent Li cations to produce a covalent organic framework derivative, which has silicon as a center atom in the tetrahedral structure and two phenyl groups and one unsaturated acetyl group at a face of the derivative doped with magnesium ions.

Example 13

Preparation of Covalent Organic Framework Derivative Doped with $Li^+$ Ions 1.0 mL of a solution of mesitylene and dioxane with 1:1 ratio by volume (v/v), 0.05 mmol of tetra(4-(dihydroxy)borylphenyl)methane having one phenyl group, and 0.07 mmol of 2,3,6,7,10,11-hexahydroxytriphenylene were placed in a pyrex tube.

The pyrex tube was instantly frozen to 77K in a $LN_2$ bath, vacuum treated and sealed by decreasing internal pressure of the tube to 150 mTorr.

After heating the reaction mixture in the tube at 85° C. for 9 days, the resultant green precipitate was separated and washed using 10 mL of anhydrous tetrahydrofuran. The treated mixture was dipped in another 10 mL of anhydrous tetrahydrofuran for 8 hours.

Next, evaporating the solvent at room temperature under vacuum conditions resulted in a covalent organic framework in green powder form, which has carbon as a center atom in the tetrahedral structure and one phenyl group at a face of $C_2O_2B$ ring.

The resultant framework was placed in a solution comprising lithium acetate dihydrate ($CH_3COOLi.2H_2O$) in a chloroform solution. After stirring the solution by a magnetic stirrer to homogeneously disperse the lithium acetate solution, the chloroform solution was completely evaporated to result a covalent organic framework dispersed with lithium acetate.

After this, lithium acetate was converted into lithium metal by reducing treatment at 150° C. for 2 hours while flowing 200 sccm of hydrogen to produce a covalent organic framework derivative, which has carbon as a center atom in the tetrahedral structure and one phenyl group at a face of $C_2O_2B$ ring doped with lithium ions.

Example 14

Preparation of Covalent Organic Framework Derivative Doped with $Li^+$ Ions The procedure described in Example 13 was repeatedly conducted, except that tetra(4-(dihydroxy)borylphenylphenyl)methane was used instead of tetra(4-(dihydroxy)borylphenyl)methane to produce a covalent organic framework derivative, which has carbon as a center atom in the tetrahedral structure and two phenyl groups at a face of $C_2O_2B$ ring doped with lithium ions.

Example 15

Preparation of Covalent Organic Framework Derivative Doped with $Li^+$ Ions The procedure described in Example 13 was repeatedly conducted, except that tetra(4-(dihydroxy)borylphenylacetylphenyl)methane was used instead of tetra(4-(dihydroxy)borylphenyl)methane to produce a covalent organic framework derivative, which has carbon as a center atom in the tetrahedral structure and two phenyl groups and one unsaturated acetyl group at a face of $C_2O_2B$ ring doped with lithium ions.

Example 16

Preparation of Covalent Organic Framework Derivative Doped with $Mg^{2+}$ Ions The procedure described in Example 13 was repeatedly conducted, except that bivalent Mg cations as metal cations were used instead of monovalent Li cations to produce a covalent organic framework derivative, which has carbon as a center atom in the tetrahedral structure and one phenyl group at a face of the derivative doped with magnesium ions.

Example 17

Preparation of Covalent Organic Framework Derivative Doped with $Mg^{2+}$ Ions The procedure described in Example 14 was repeatedly conducted, except that bivalent Mg cations as metal cations were used instead of monovalent Li cations to produce a covalent organic framework derivative, which has carbon as a center atom in the tetrahedral structure and two phenyl groups at a face of the derivative doped with magnesium ions.

Example 18

Preparation of Covalent Organic Framework Derivative Doped with $Mg^{2+}$ Ions The procedure described in Example 15 was repeatedly conducted, except that bivalent Mg cations as metal cations were used instead of monovalent Li cations to produce a covalent organic framework derivative, which has carbon as a center atom in the tetrahedral structure and two phenyl groups and one unsaturated acetyl group at a face of the derivative doped with magnesium ions.

Example 19

Preparation of Covalent Organic Framework Derivative Doped with $Li^+$ Ions The procedure described in Example 13 was repeatedly conducted, except that tetra(4-(dihydroxy)borylphenyl)silane was used instead of tetra(4-(dihydroxy)borylphenyl)methane to produce a covalent organic framework derivative, which has silicon as a center atom in the tetrahedral structure and one phenyl group at a face of $C_2O_2B$ ring doped with lithium ions.

Example 20

Preparation of Covalent Organic Framework Derivative Doped with $Li^+$ Ions The procedure described in Example 13 was repeatedly conducted, except that tetra(4-(dihydroxy)borylphenylphenyl)silane was used instead of tetra(4-(dihydroxy)borylphenyl)methane to produce a covalent organic framework derivative, which has silicon as a center atom in the tetrahedral structure and two phenyl groups at a face of $C_2O_2B$ ring doped with lithium ions.

Example 21

Preparation of Covalent Organic Framework Derivative Doped with $Li^+$ Ions The procedure described in Example 13 was repeatedly conducted, except that tetra(4-(dihydroxy)borylphenylacetylphenyl)silane was used instead of tetra(4-(dihydroxy)borylphenyl)methane to produce a covalent organic framework derivative, which has silicon as a center atom in the tetrahedral structure and two phenyl groups and one acetyl group at a face of $C_2O_2B$ ring doped with lithium ions.

Example 22

Preparation of Covalent Organic Framework Derivative Doped with $Mg^{2+}$ Ions The procedure described in Example 19 was repeatedly conducted, except that bivalent Mg cations as metal cations were used instead of monovalent Li cations to produce a covalent organic framework derivative, which has carbon as a center atom in the tetrahedral structure and one phenyl group at a face of the derivative doped with magnesium ions.

Example 23

Preparation of Covalent Organic Framework Derivative Doped with $Mg^{2+}$ Ions The procedure described in Example 20 was repeatedly conducted, except that bivalent Mg cations as metal cations were used instead of monovalent Li cations to produce a covalent organic framework derivative, which has carbon as a center atom in the tetrahedral structure and two phenyl groups at a face of the derivative doped with magnesium ions.

Example 24

Preparation of Covalent Organic Framework Derivative Doped with $Mg^{2+}$ Ions The procedure described in Example 21 was repeatedly conducted, except that bivalent Mg cations as metal cations were used instead of monovalent Li cations to produce a covalent organic framework derivative, which has carbon as a center atom in the tetrahedral structure and two phenyl groups and one unsaturated acetyl group at a face of the derivative doped with magnesium ions.

As described above, a covalent organic framework derivative according to the present invention has a great hydrogen storage capacity at room temperature under ambient pressure so that the derivative is advantageously used as a hydrogen storage material of hydrogen fuel battery system especially for automobiles, therefore, can greatly facilitate development and distribution of advanced automobiles with hydrogen fuel batteries.

While the present invention has been described with reference to the preferred embodiments and examples, it will be understood by those skilled in the art that various modifications and variations may be made therein without departing from the scope of the present invention as defined by the appended claims.

What is claimed is:

1. A covalent organic framework derivative for hydrogen storage with crystalline structure comprising covalent bonds of regular tetrahedron structural organic molecules and triangle structural organic molecules doped with metal cations.

2. The derivative according to claim 1, wherein a center atom in the tetrahedral structure is carbon (C) or silicon (Si).

3. The derivative according to claim 1, wherein four bonds of the center atom in the tetrahedral structure are linked to a face of the triangular structure by covalent bonding, respectively.

4. The derivative according to claim 1, wherein a center of the triangular structure is a $B_3O_3$ ring or $C_2O_2B$ ring.

5. The derivative according to claim 4, wherein the ring has boron bonds to fabricate the triangular faces and is organic molecules in which each of the triangular faces has at least one phenyl group.

6. The derivative according to claim 4, wherein the organic molecule bonded to boron (B) of the $B_3O_3$ ring has at least one phenyl group.

7. The derivative according to claim 1, wherein the metal cations are alkali metal cations or alkali-earth metal cations.

8. The derivative according to claim 7, wherein the alkali metal cations are monovalent lithium cations ($Li^+$).

9. The derivative according to claim 7, wherein the alkali-earth metal cations are bivalent magnesium cations ($Mg^{2+}$).

10. A method for hydrogen storage using the covalent organic framework derivative according to claim 1.

11. The method according to claim 10, wherein the metal cations doped to the derivative are adsorbed with hydrogen molecules.

12. A method for hydrogen storage using the covalent organic framework derivative according to claim 2.

13. A method for hydrogen storage using the covalent organic framework derivative according to claim 3.

14. A method for hydrogen storage using the covalent organic framework derivative according to claim 4.

15. A method for hydrogen storage using the covalent organic framework derivative according to claim 5.

16. A method for hydrogen storage using the covalent organic framework derivative according to claim 6.

17. A method for hydrogen storage using the covalent organic framework derivative according to claim 7.

18. A method for hydrogen storage using the covalent organic framework derivative according to claim 8.

19. A method for hydrogen storage using the covalent organic framework derivative according to claim 9.

* * * * *